Dec. 18, 1962    P. A. KING ETAL    3,068,565
METHOD OF MAKING HONEYCOMB LAMINATE
Filed Oct. 16, 1958    8 Sheets-Sheet 1

INVENTORS
PAUL A. KING
JULIUS L. GIOVANNUCCI
BY
*Kenyon & Kenyon*
ATTORNEYS

INVENTORS
PAUL A. KING
JULIUS L. GIOVANNUCCI
BY
ATTORNEYS

Dec. 18, 1962 P. A. KING ETAL 3,068,565
METHOD OF MAKING HONEYCOMB LAMINATE
Filed Oct. 16, 1958 8 Sheets-Sheet 3
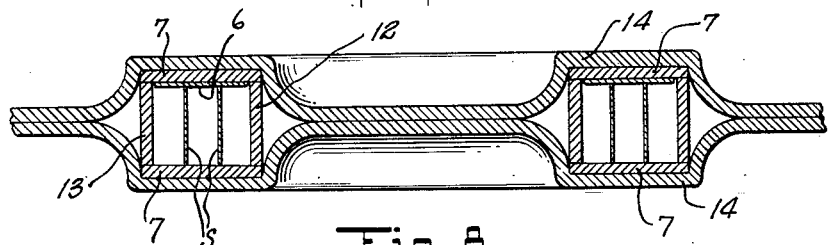
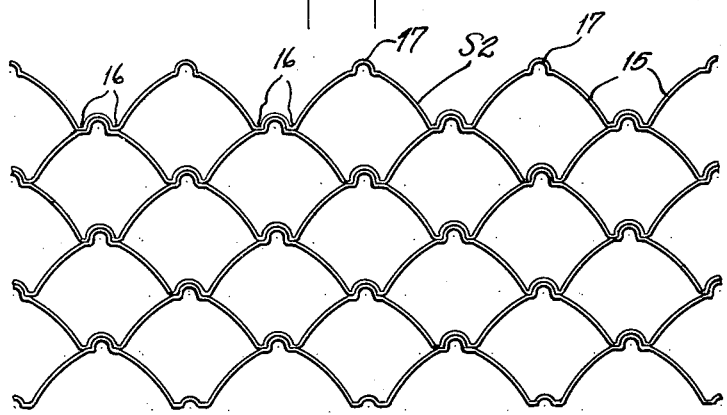
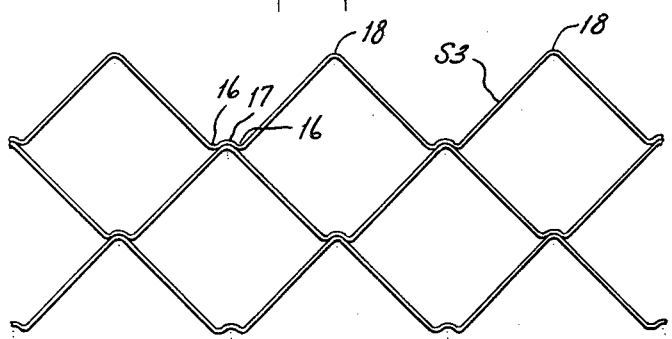
INVENTORS
PAUL A. KING
JULIUS L. GIOVANNUCCI
BY
Kenyon & Kenyon
ATTORNEYS Dec. 18, 1962    P. A. KING ETAL    3,068,565
METHOD OF MAKING HONEYCOMB LAMINATE Filed Oct. 16, 1958    8 Sheets-Sheet 4

INVENTORS
PAUL A. KING
JULIUS L. GIOVANNUCCI
BY

Kenyon & Kenyon
ATTORNEYS

Dec. 18, 1962   P. A. KING ETAL   3,068,565
METHOD OF MAKING HONEYCOMB LAMINATE
Filed Oct. 16, 1958   8 Sheets-Sheet 6

INVENTORS
PAUL A. KING
JULIUS L. GIOVANNUCCI
BY
ATTORNEYS

Dec. 18, 1962 P. A. KING ETAL 3,068,565
METHOD OF MAKING HONEYCOMB LAMINATE
Filed Oct. 16, 1958 8 Sheets-Sheet 7

INVENTORS
PAUL A. KING
JULIUS L. GIOVANNUCCI
BY
Kenyon & Kenyon
ATTORNEYS

Dec. 18, 1962 P. A. KING ETAL 3,068,565
METHOD OF MAKING HONEYCOMB LAMINATE
Filed Oct. 16, 1958 8 Sheets-Sheet 8

INVENTORS
PAUL A. KING
JULIUS L. GIOVANNUCCI
BY
ATTORNEYS

United States Patent Office 3,068,565
Patented Dec. 18, 1962

3,068,565
METHOD OF MAKING HONEYCOMB LAMINATE
Paul A. King and Julius L. Giovannucci, Stratford, Conn., assignors to National Distillers and Chemical Corporation, Richmond, Va., a corporation of Virginia
Filed Oct. 16, 1958, Ser. No. 767,626
8 Claims. (Cl. 29—472.3)

This invention relates to all-metal honeycomb laminate and to a process for effecting its manufacture.

Honeycomb laminate essentially comprises a core having the general appearance of honeycomb and skins which are fastened to both sides of this core to the edges of its walls. In the case of all-metal honeycomb laminate everything is made of metal, the core being assembled by welding or brazing and the skins being fastened to its edges by welding or brazing.

Now if all of the core walls are joined together perfectly and if the skins are joined to the core perfectly throughout all of its walls' edges, a panel or other shape of tremendous strength for its weight is produced. For aircraft construction the metal used may be stainless steel and for other applications the metal may be plain carbon steel, it being understood that the specific metal used depends to a large extent on the use to which the product is to be put.

The manufacture of such all-metal honeycomb laminate currently presents severe problems. One concerns the assembly of the core, this ordinarily being made from suitably bent metal strips which are difficult to put together. Both the actual assembly and adequate joining are difficult and unless done properly the core does not have the strength it should have. The edges of the walls of the core are difficult to assemble in a flush condition and may require grinding to make them flush. If there are slight inequalities it becomes very difficult if not impossible to cause the skins to join properly with the walls' edges. There are other difficulties familiar to anyone who has tried to make this product.

One of the objects of the present invention is to provide a core construction which may be assembled more easily to provide joints between its components, which may be united easily and strongly throughout the core. Another object is to provide for more firmly and reliably joining the skins to the core so that the walls' edges of the core are firmly joined with the skins throughout the extent of the product and even though these edges may not be exactly flush due to either imperfect grinding or possibly because of not being ground at all. A general object is to provide an overall improvement in the honeycomb laminate art, provide for greater flexibility of design and less expensive manufacture than has been customary heretofore. Other objects may be inferred from the following disclosure of specific examples of the invention.

The present invention makes use of the invention disclosed and claimed by the Julius L. Giovannucci application Serial No. 606,325, filed August 27, 1956, for All-Metal Honeycomb Laminate and Process for Making the Same, now Patent 3,009,241 dated November 21, 1961.

Very briefly, according to the invention of the above-identified application, an all-metal honeycomb core is assembled and at least the edges of the walls of this honeycomb core are wet with a liquid to which powdered brazing metal will adhere. While this liquid remains wet on the edges this core is immersed in powdered brazing metal the particles of which adhere to the edges of the honeycomb core's walls. Ordinarily the liquid is then dried or allowed to dry so that the brazing powder particles are in effect glued to the edges. Metal sheet outer skins or laminations are then superimposed on the edges of the honeycomb core.

The above assembled but unbrazed laminate is placed in an enclosure or envelope providing flexible sheet metal diaphragms or walls which overlie the sheet components of the laminate. This enclosure is then evacuated so that the atmospheric pressure flexes its diaphragms or walls inwardly so as to in turn flex the sheet metal laminate components against the edges of the honeycomb core, this placing and holding these parts in abutting relation substantially throughout their entire extents. The enclosure is also made of metal throughout so that it may be subjected to brazing heat as by immersing the entire enclosure in a molten salt bath maintained at a suitable temperature. Since only thin walls separate the brazing metal from the applied heat the brazing is effected rapidly. By maintaining the evacuation during this brazing and thereafter until the brazing metal solidifies, the abutting relationship previously described is effectively maintained. Soldification is rapid because the brazing metal is separated from any cooling medium used, again only by the thin metal walls and sheets. The resulting all-metal honeycomb laminate is then removed from the enclosure.

If desired the brazing metal could be interposed between the core and its skins in the form of a thin sheet of the brazing metal. If the strength of the core's walls are not adequate to permit the use of full atmospheric pressure while these walls are weakened by the brazing heat, it is possible to first draw as perfect a vacuum as possible in the enclosure or envelope and to then backfill the latter with non-oxidizing gas such as hydrogen or argon. If this is done the pressure differential between the inside and outside of the envelope should be kept sufficiently large to assure that the skins are pressed against the core by the atmosphere with adequate pressure to make the skins conform to the core throughout the latter's extent.

In practicing the above invention difficulties were encountered in easily assembling the core components. Furthermore, the core construction then used did not permit the flexibility of contour design subsequently demanded by the aircraft industry in particular.

In addition to its other obvious advantages this prior invention had the great advantage that the brazing metal was drawn by capillary attraction throughout all of the joints including the joints between the core walls.

The present invention deals in particular with the core or honeycomb lamination while continuing to enjoy all of the advantages of the described prior invention. Specific examples of the present invention are illustrated by the accompanying drawings in which:

FIG. 7 is a cross section taken through the line 7—7 in FIG. 6, but, like FIG. 2, showing the assembly while enclosed in the flexible envelope and evacuated for brazing;

FIG. 8 is a top view showing a further modification of the new core;

FIG. 9 is like FIG. 8 but shows still another modification;

A characterizing feature of the present invention is that various shaped strips which are laid laterally together to form the honeycomb core, are shaped in such a fashion as to provide a laterally springy or elastically deformable action. In other words, the various strips are shaped so that lateral pressure may be applied to them to cause them to individually spring or deform to bring all of their portions to be interjoined into proper intercontact throughout the entire core. It is only necessary to lay the strips together and apply pressure directed inwardly with respect to the core in the general plane of the latter. Where there may be slight inaccuracies in the shape of the strip the elastic give and take, as it were, brings all of the portions to be joined together so that these portions provide the capillary passages into and through which the brazing metal may flow or be drawn by capillary action when the brazing heat is applied.

Figure 1:
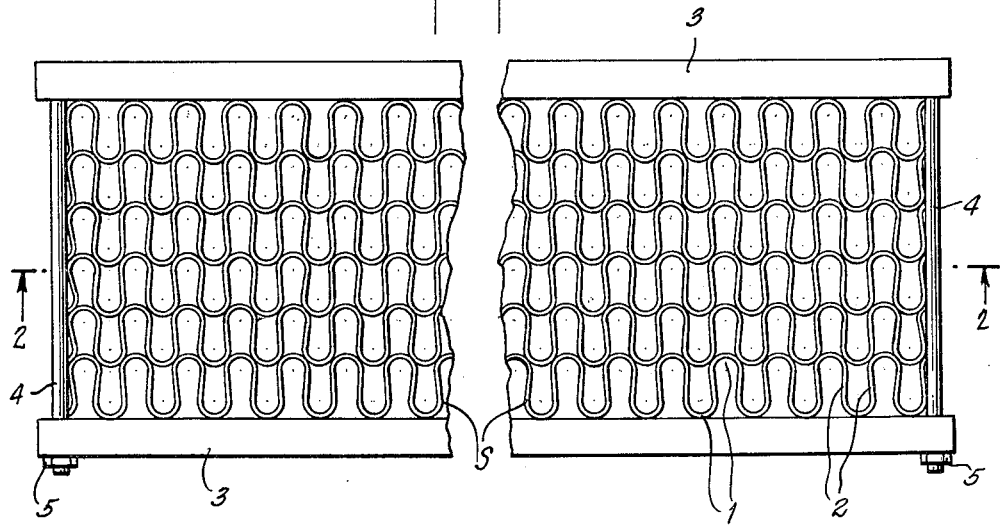
FIG. 1 is a top view showing the manner in which the new core is assembled.

With the above general concept in mind, FIG. 1 shows the various strips S as each comprising a shape somewhat like ribbon candy. That is to say, each strip is made with oppositely facing semi-circular loops 1 having their corresponding ends interjoined by straight portions 2 which extend transversely with respect to the shaped strip.

The required number of these strips are internested with the crests of one fitted into the valleys of the other. The strips need only be pushed laterally together on a flat surface. Considering normal manufacturing problems the strips usually will not internest to provide line contacts throughout the assembly. However, such contacts should be obtained wherever the loops 1 are tangent to each other.

Now clearly the strips S are somewhat like springs. They are, of course, made of metal and their thickness is not great and the strips may be very thin as in the case of aircraft honeycomb laminate.

Because of this resiliency, elastic deformability or springiness, all of the desired line contacts are obtained when lateral pressure is applied to the assembled core. FIG. 1 shows the use of two clamping bars 3, one on each side of the assembled core, with the two bars provided at their ends with draw bolts 4 interconnecting the bars and provided with nuts 5 which may be tightened. By tightening the nuts 5 the lateral pressure is applied to the strips S. Wherever the tangent loops 1 fail to intercontact, those that are contacting spring or give until ultimately every loop 1 is in line contact throughout with every other loop 1.

Figure 10:
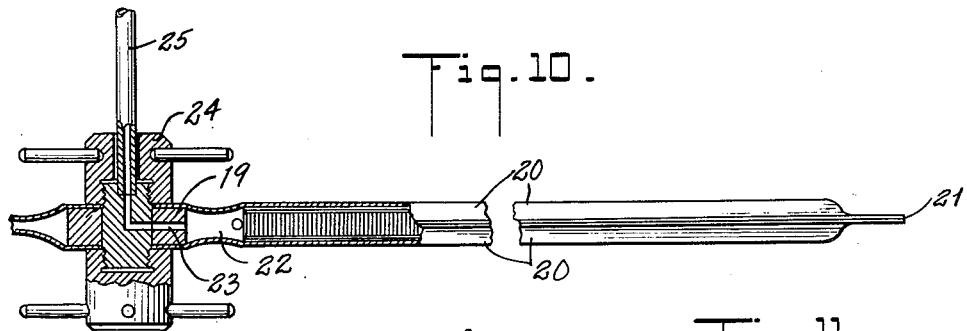
FIG. 10 is a partially vertically sectioned side elevation of the commercial form of apparatus corresponding to the FIG. 2 showing.

While still clamped as shown by FIG. 1 the complete laminate is assembled by placing a foil layer of brazing metal 6 on one side of the assembled core and then superimposing the necessary skins 7 on both sides of the core, this laminate assembly then being placed, with the core clamp still in place, within the flexible sheet metal envelope 8 which is then hermetically sealed. This envelope or enclosure 8 is shown as merely comprising the piece of sheet metal folded over the assembly and seam welded together. It must, of course, be provided with an outlet through which the air may be sucked from its interior. The commercially used envelope, often referred to as the vacuum fixture, is shown by FIG. 10. The exact construction is unimportant to the present invention providing that the enclosure used provides relatively thin and flexible diaphragm sections overlying the skins 7 and which apply uniform pressure to the skins 7 so as to flex the latter into complete contact with the edges of the walls of the core even though these edges may not be exactly flush throughout the core assembly.

Figure 11:
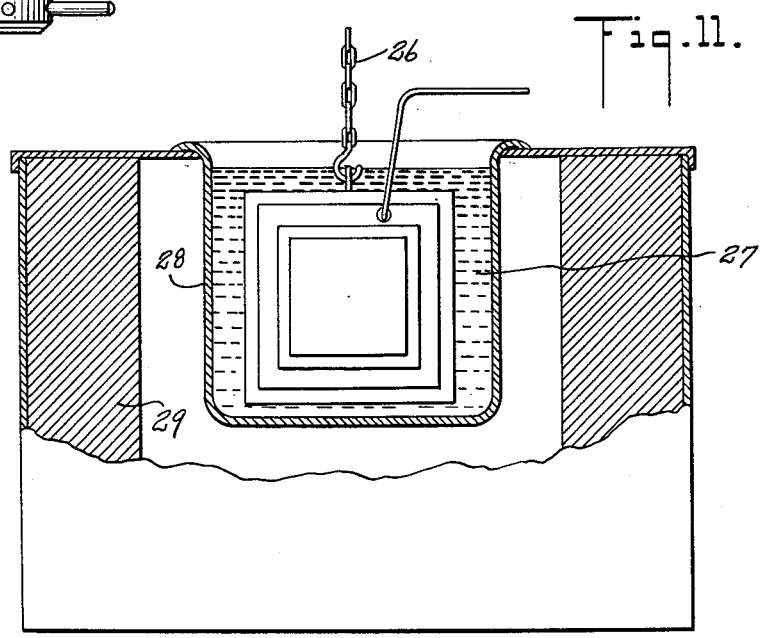
FIG. 11 is a vertically cross sectioned view showing a conventional hot molten salt pot and its furnace, with the assembly of FIG. 10 being lowered into the molten salt for the application of the brazing heat.

While continuously evacuating the enclosure or fixture 8 is subjected to brazing heat as by being lowered into a bath of hot molten salt as indicated by FIG. 11 which is discussed more in detail later along with FIG. 10.

When the brazing foil 6 melts or fuses it is drawn by capillary action into each of the interpressing joint surfaces between each of the loops 1, feeds completely throughout the lengths of these joint surfaces and is then drawn by capillary action between the interpressing surfaces of the edges of the core walls and the skins 7 which is opposite to the initial location of the foil 6. This action occurs by capillary action and not because of gravity. The action occurs regardless of the position of the laminate assembly and its fixture or enclosure, during the brazing action. Due to the thickness of all of the parts and the fact that they are all metallic, causes the brazing foil 6 to reach its flow temperature very rapidly. The fixture and its contents may be removed from the heating source very promptly after the brazing action has started and if desired it may be quenched to rapidly cool the now brazed honeycomb laminate.

Figure 3:
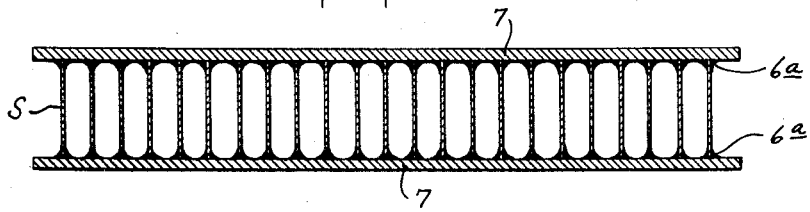
FIG. 3 is a cross section taken through the finished product.

After brazing, the fixture or enclosure 8 is cut open and the resulting honeycomb laminate appears as shown by FIG. 3 if the laminate is cross sectioned by cutting. Note that the parts are now all interjoined by the brazing metal 6a which has been drawn by capillary action between all of the interpressing surfaces. The brazing metal 6a forms tiny fillets and has a smooth appearance. Its inwardly curved shape is actually a meniscus and results from the capillary action. Great mechanical strength is obtained throughout the entire honeycomb laminate.

The foregoing results are not obtainable without using the totally enclosing fixture with its flexible diaphragming action. In other words, it is impossible to merely draw a vacuum within the honeycomb core itself, because this serves only to in effect position the skins on the honeycomb core. When the skins 7 are thin, as in the case of the aircraft type, the skins can be seen to be dimpled where they have been deflected inwardly by the atmospheric pressure.

Although not previously mentioned, the core clamp is, of course, removed after the brazing action.

Figure 4:
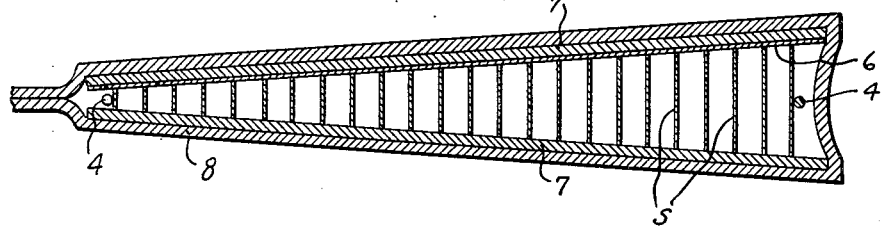
FIG. 4 is similar to FIG. 2 excepting it shows how the product may be made with a wedge shape.

By using the strips S in progressively varying widths it is possible to assemble easily a wedge shape as indicated by FIG. 4. This figure is generally the same as FIG. 2 excepting for the transverse wedge contour. Such a shape may also be obtained by edge machining or finishing of the core shown by FIG. 2, but this is expensive.

Using strips of varying widths only slight machining may be required to provide reasonably flush core wall edges.

Figure 5:
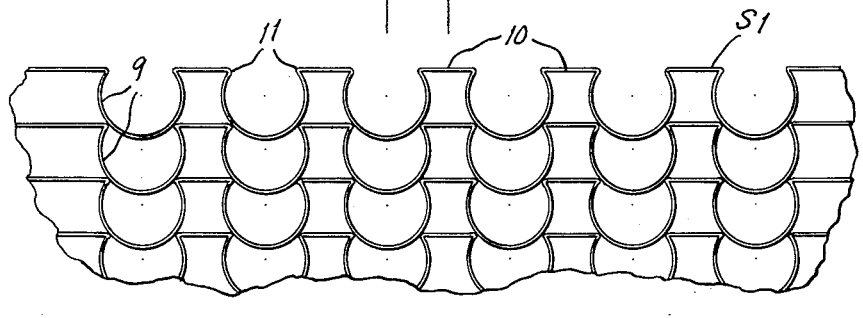
FIG. 5 is a top view showing a section of a modified form of the new core.

Other core strip shapes are possible. They should, of course, provide the spring action described. FIG. 5 shows a modification wherein the strips S1 each have loops 9 with each loop projecting in the same direction from the otherwise flat contours 10 of the strip which was, of course, flat throughout its length prior to the necessary forming operation. The circular loops 9 are not complete circles but are greater than semi-circles and so their shapes provide ridges 11, these ridges of one strip pressing against the loops of the next strip with the loops springing as required to provide the previously described elasticity throughout the core assembly.

Figure 6:
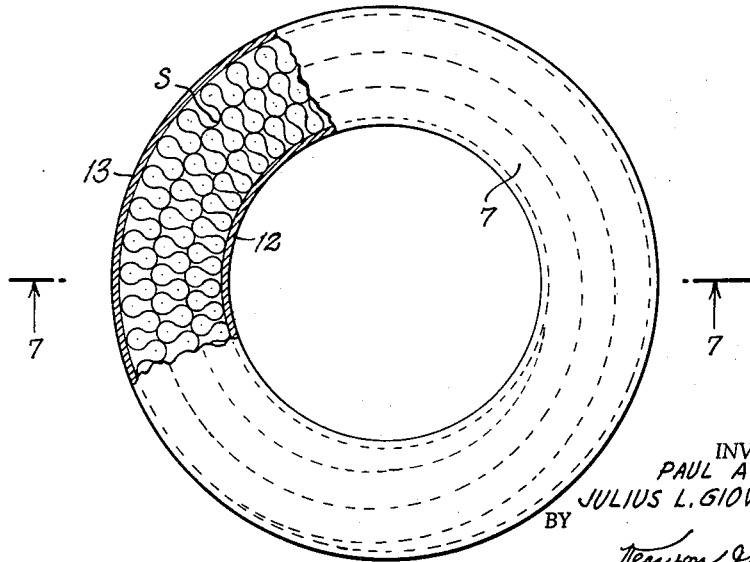
FIG. 6 is a partially broken away top view of a finished honeycomb laminate ring emphasizing the flexibility of the new core construction.

In addition to providing for easy assembly and accurate line contact in all cases, the flexible core strips accommodate themselves to unusual honeycomb laminate shapes. FIG. 6 shows how the elasticity of the honeycomb core strips provide for the formation of rings of honeycomb laminate. In FIG. 6 the strips are substantially the same as those shown by FIGS. 1 through 3 and they are, therefore, indicated by the same letter S.

In addition this FIG. 6 exemplifies another advantage of the flexibility of this new core. Thus rings 12 and 13 are pre-made to the desired dimensions. The rings may be cut from pipe or the like having different diameters. Then the core strips are assembled with a somewhat greater radial thickness than the distance between the outside and inside diameters of the rings 12 and 13 respectively. Next the resulting annular core is press fitted within the two rings, the core's flexibility permitting this and also causing intercontact between all portions of the core which must be jointed together.

This FIG. 7 also showns the sheet metal evacuated envelope 14 as comprising two pieces laid together and seam welded all around the laminate assembly. The previously described clamping action may be obtained by properly sizing the rings 12 and 13 so that they apply the previously described lateral pressure. These rings should be sized to apply more pressure than is ever to be needed, the elasticity of the core strips permitting this and the lack of adjustability of what might be called the clamping rings 12 and 13 indicating this excessive pressure as being a desirable precaution. FIG. 7 also serves to show the great flexibility of the enclosing fixture which when evacuated is sucked together within the honeycomb laminate ring assembly.

Throughout the foregoing the foil 6 has been shown for supplying the brazing metal. However, the powdered brazing metal practice of the previously described Giovannucci application may also be used. In all cases the cleanliness so important to adequate brazing action should be provided.

Another point worth mentioning at this time is that with some metals and some gages the strips S may not be rigid enough to support the full atmospheric pressure when heated during the brazing. If such core collapse is experienced, the remedy is to draw substantially a full vacuum while the fixture and its contents are cold and to then back-fill or gas the fixture somewhat with a non-oxidizing gas such as hydrogen or argon. When resorting to this practice a sufficient pressure differential should be maintained to obtain the desired firm pressing of the laminate skins against the edges of the walls of the honeycomb core.

A further modification of the new core is shown by FIG. 8 where each strip S2 is made with substantially straight zigzag walls 15 which are, however, bowed very slightly so as to be flexible. The apex between each of the parts 15 is formed to provide shelves or flanges 16 between which small loops 17 are formed. The loops 17 all point in the same direction and they internest from strip to strip and together with the shelf members which intercontact throughout, provide broad surfaces for drawing in the molten brazing metal during the brazing action.

The described flexibility is obtained by the parts 15 being slightly bowed between the shelf portions 16 of each strip. The parts 15 bow more or less in accordance with the flexibility required to make all of the parts interfit during the previously described lateral clamping or compressing action.

FIG. 9 is generally like FIG. 8 excepting here the strips S3 have the shapes 16 and 17 missing or eliminated along one side of each strip so as to provide relatively sharp corners 18. The corners 18 of one strip fitting within the loops 17 of the next. The portions 16 are reduced greatly in size and may be present only to the degree required to effect the reverse bending for providing the loops 17. This modification provides line contacts for receiving the molten brazing metal.

As previously indicated, FIGS. 10 and 11 illustrate the commercial equipment used. Here the honeycomb laminate assembly, which may be the same as shown by FIG. 1, is encircled by a strutting ring 19 which is also encompassed by the envelope which is formed by the two sheets 20 of thin flexible metal seam welded together around their periphery as at the location indicated by 21. This ring struts the two sheets for flexible diaphragms 20 apart and provides a space 22 surrounding the honeycomb laminate assembly and permitting the latter to expand during the heating. Also, the ring 19 is provided with an exhaust passage 23 leading from the space 22 to a connection 24 which gas-tightly clamps the exhaust pipe 25 to the fixture. This pipe 25 is also metallic as are all of the other parts.

With the full vacuum drawn, or a partial vacuum in conjunction with the gassing previously mentioned, the entire fixture of FIG. 10 may be picked up by a chain connection 26 and lowered briefly into molten salt 27 held in a pot 28 positioned in a pot heating furnace 29. The temperature of the salt 27, of course, depends on the brazing metal used. For some purposes this metal may have a low flow temperature and for others a high-temperature flow point brazing metal may be required. This latter may be particularly true in the case of stainless steel or titanium honeycomb laminate designed for rocket constructions. As soon as the brazing is effected the fixture is, of course, removed and, if desired, quenched. Thereafter simple edge shearing opens the fixture so that the laminate may be removed.

Figure 2:
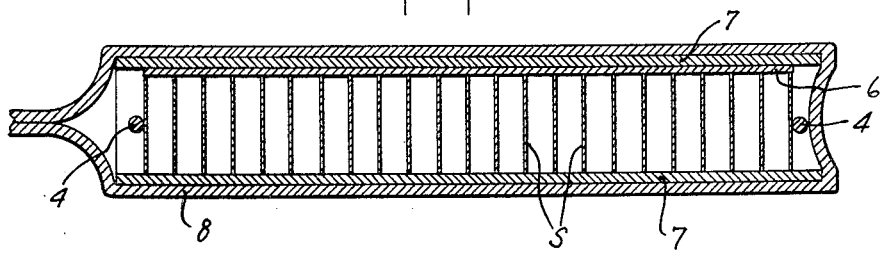
FIG. 2 is a cross section of FIG. 1 taken on the line 2—2 in FIG. 1 and, in addition, it shows the skins applied to the core with the brazing metal used in the form of a thin sheet or foil and with all of the parts enclosed in the evacuated flexible enclosure or envelope, this entire figure being in cross section so as to correspond throughout.
Figure 12:
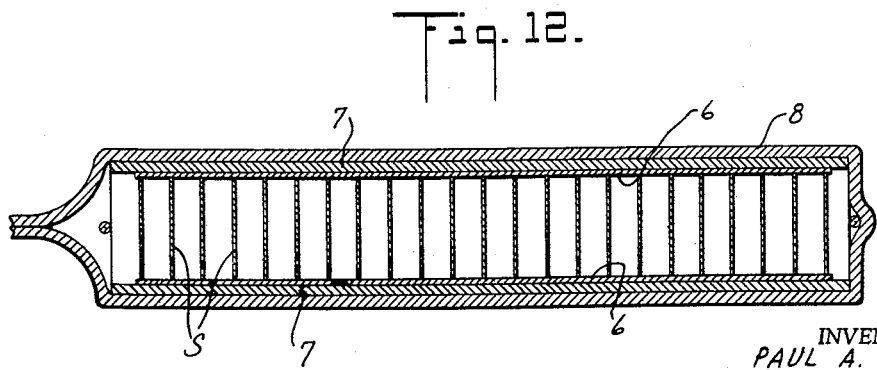
FIG. 12 is similar to FIG. 2 excepting that it shows a modification.

FIG. 12 shows the construction of FIG. 2 excepting that the brazing foil 6 is located on both sides of the honeycomb core. In some instances this may be desirable or necessary. More plainly, for very light-weight constructions the powdered brazing technique of the prior Giovannucci application may be most useful, where extremely light weight is not so important a single layer of foil may be used and for very heavy duty applications the foil may be used on both sides of the honeycomb core. In all cases due to the tight interpressure of the surfaces to be joined the brazing metal is drawn by capillary actions to all of the places where joining is required.

Figure 13:
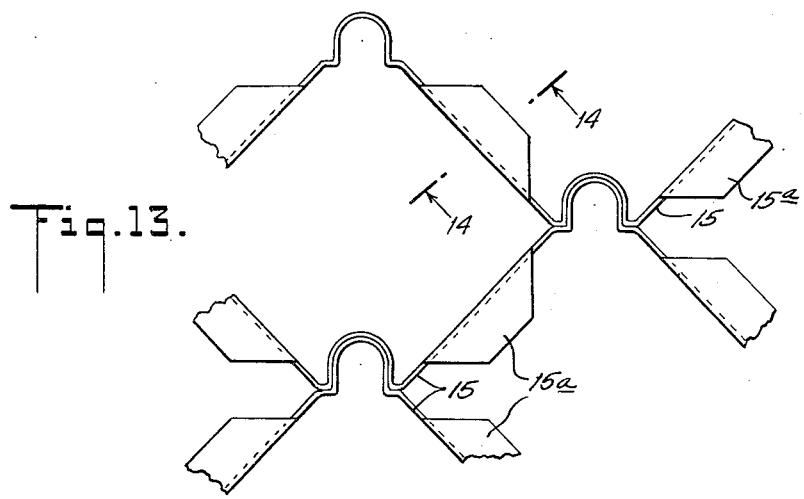
FIG. 13 is a top view of the core section showing a further modification.
Figure 14:
FIG. 14 is a cross section taken on the line 14—14 in FIG. 13.

In FIGS. 13 and 14 the core construction of FIG. 8 is shown excepting that the wall portions 15 have tabs 15a formed on both of their edges. These tabs should not extend the full lengths of the parts 15 so as to prevent entirely their bowing action. As shown by FIG. 14 the tabs 15a do not extend at right angles with respect to the wall portions 15 but, instead, are angled slightly outwardly away from each other. A few degrees outwardly is required. With this core modification even considerable deviations from core wall edge flushes does not prevent proper interpressing between these wall portions and the skins. This is because each of these small tabs 15a can spring inwardly more or less while constantly pressing against the skins during the brazing operation. This is of advantage when the skins are too thick to flex easily, or when the core strips are of such light gage as to permit the use of very little differential pressure for skin pressing action.

Figure 15:
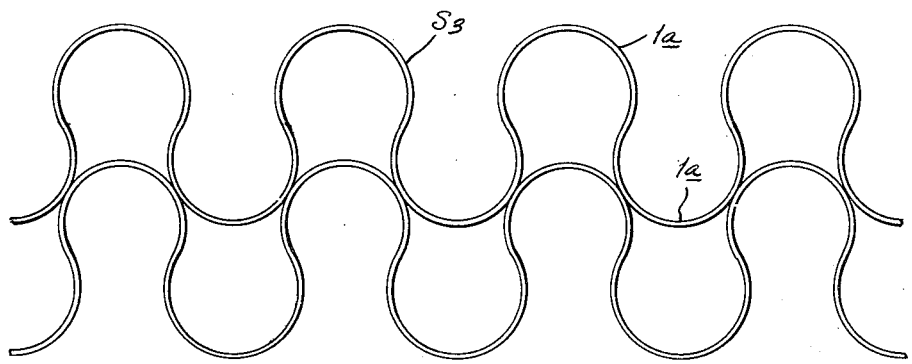
FIG. 15 is a top view showing still another modification of the core construction.

In FIG. 15 the strips S3 are somewhat like the strips S of the first example but comprise only the loops 1a. The straight portions 2 are eliminated. Core strips shaped in this manner provide very great flexibility in all directions.

Figure 16:
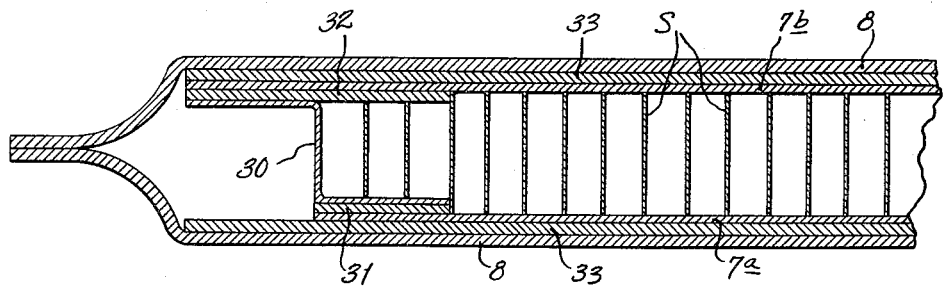
FIG. 16 is a cross section of the honeycomb laminate assembly in the envelope and provided with a finishing edge construction.

Commercial honeycomb laminate normally requires edge finishing and an example of this is shown by FIG. 16. Here a frame is first made somewhat like the rings of FIG. 6 but now being rectangular and comprising a plurality of parts. Thus Z bars 30 are welded to form a rectangular frame. Then reinforcing strips 31 and 32 are placed beneath the inner flanges of these bars and a skin 7a is placed beneath them. This leaves an upwardly open receptacle in effect. Into this the strips S are packed or press fitted to form a core compressed by the frame of Z bars, the strips over the inner flanges being narrower than the others as required for a fit. The uncompressed extent of this core is larger than the frame's inside dimensions. Then brazing foil or the like (not shown) is placed on the upper edges of this core, a second wider reinforcing strip is placed on this foil to register with both flanges of the Z bars and the other skin 7b is applied.

Brazing metal is, of course, interposed between any other parts where it may be required so that they are brazed into position simultaneously with the brazing action previously described.

It will be remembered that reference was made to the appearance of dimples on the skins of the laminate. In FIG. 16 baffle plates 33 are interposed between the flexible diaphragm parts 8, of the evacuated fixture, and the skins 7. These baffle plates should be thin enough to flex under the atmospheric pressure and to provide the desired uniform pressure on the skins during the brazing action. These baffle plates should be thick enough to prevent the thin fixture diaphragms from bulging the skins down into the honeycomb spaces.

Figure 17:
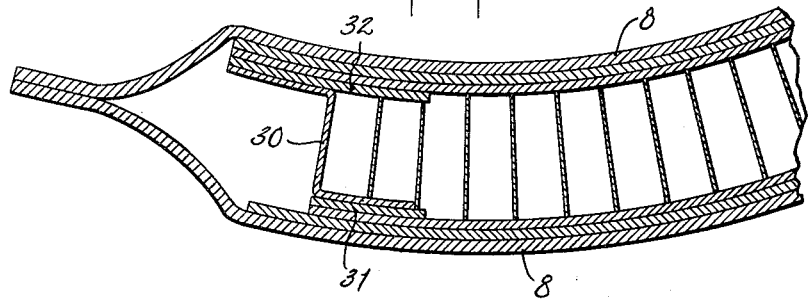
FIG. 17 is like FIG. 16 excepting that it shows how the great core flexibility permits a curved cross sectional contour.

The great flexibility of the new core is illustrated by FIG. 17 where the FIG. 16 construction is shown as being curved transversely to the plane of the honeycomb laminate assembly. This assembly may be initially made on a curved form or platform, this being permissible because of the core flexibility. Evacuation of the fixture or envelope does not change this curved shape since the atmospheric pressure is exerted uniformly all over the fixture.

Figure 18:
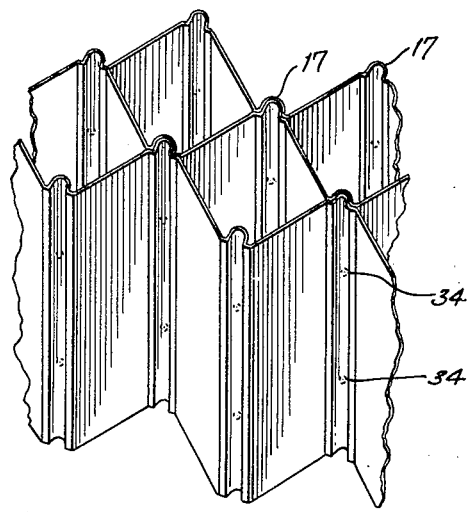
FIG. 18 is a perspective of the FIG. 8 core construction and illustrating how spot welding may be used to facilitate the core assembly.

In some instances it may be desirable to assemble the honeycomb core strips described in one location and to take them to another for final assembly of the laminate, or, generally speaking, it may be desirable to move the core assembly around before its lateral clamping. Therefore, FIG. 18 is provided which in perspective shows the core construction of FIG. 8 but with the internesting loop portions 17 interconnected mechanically at various points by spot welding spots 34. The concept here is to interconnect only as required to integrate the core strips so that the core may be handled prior to its being laterally clamped. For example, in FIG. 16 the just-described practice may be of advantage while getting all of the parts assembled. The application of the lateral pressure may be effected through the Z bars 30 and the plates 31 and 32, and in such instances it may be desirable to spot weld these parts together and to the skins 7 to hold everything together prior to the brazing action.

Figure 20:
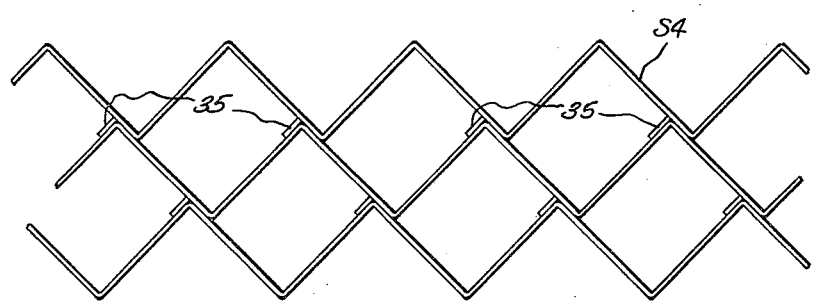
FIG. 20 is a top view showing how the strips of this FIG. 19 construction fits together.
Figure 19:
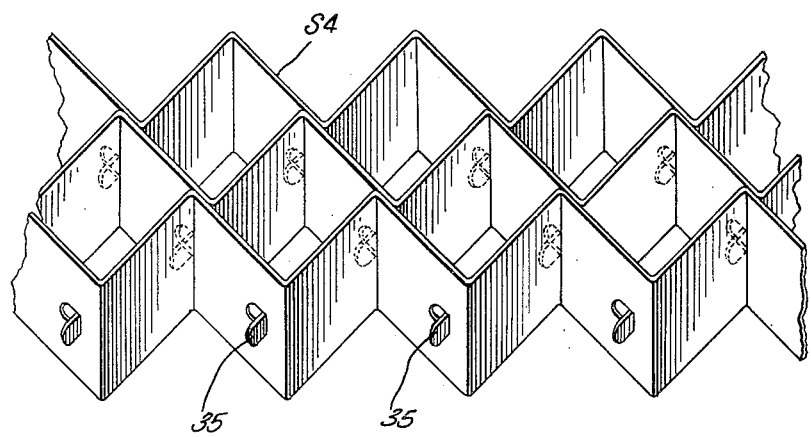
FIG. 19 is a perspective showing a further modification of the core construction.

Finally, FIGS. 19 and 20 show strips S4 in the form of simple zigzag shapes each having tabs 35 formed by partially cutting and bending the strip wall portion. These tabs are located on alternate ones of the zigzag walls of each strip and form nesting points or locations for receiving the peaks or crests of the next of the strips S4. This nesting action permits bowing or buckling of the various strips S4 when the lateral pressure is exerted to cause all of the interconnecting surfaces to press uniformly together throughout the core assembly.

Throughout the foregoing there has been the overall concept of forming a honeycomb core from strips which may be pushed laterally together to internest and automatically assemble themselves. The exertion of lateral pressure, which is edgewise with respect to the core assembly itself, deforms the various strips as required to distribute the pressure uniformly throughout the core and bring all of the strips into firm intercontact, this requiring the strips to be formed to provide this flexible action. The strip shape used and the manner of applying or using the brazing metal will depend upon the physical properties ultimately desired. In all cases the laminate assembly is placed within the evacuated flexible metal envelope or fixture. In other words, the concept is a group of flexible parts each being flexible in the direction it must fit with the other, it should be assembled under a properly distributed pressure exerted in all directions so that all parts interfit in all instances. With all of the parts interfitting and pressing together nicely, the fused brazing metal can be sucked or drawn by capillary action to all parts.

When brazing is practiced as shown by FIG. 11, that is to say with the laminate vertical, there may be a tendency for gravity to affect the flow of the brazing metal. In such instances the tabs shown by FIGS. 13 and 14 are helpful in preventing or reducing this gravitational action.

In all instances the present invention permits the simultaneous construction of a complete honeycomb laminate panel even including its edging or side finishing. It is unnecessary to first form the core completely and then later join this core with the skins and other parts. Simultaneous brazing of all parts is possible when practicing the present invention.

Honeycomb panels may be placed in compression edgewise which tends to bow the skins outwardly so as to try to pull them from the core. The tabs of FIGS. 13 and 14 provide large area brazed connections between the core edges and the skins so as to better resist separation of the skins from the core in such instances.

Figure 21:
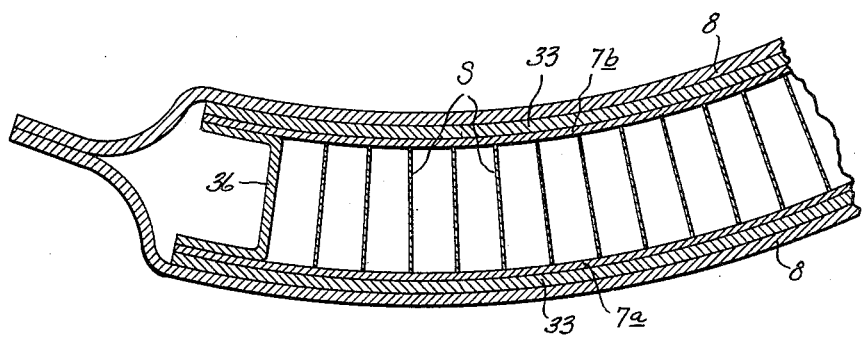
FIG. 21 is similar to FIG. 17 but shows a modification.

In FIG. 21, for a curved panel, a frame is made by using outwardly facing interfastened channel bars 36 having the core strips S elastically packed within this frame. The skins 7a and 7b are fastened to the flanges of the channels and to the edges of the core strips, the latter having the same width as the webs of the channels.

Figure 22:
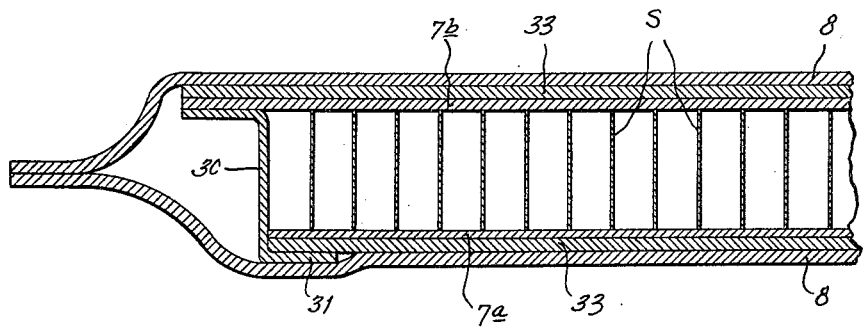
FIG. 22 is similar to FIG. 16 but shows a modification.

FIG. 22, for a flat panel, shows the Z bar frame but with the skin 7a on top of and overlapping the flange 31 and the skin 7b on top of and overlapping the flange 30. Here also, the core strips and the Z bar flange are of the same transverse dimension.

Both of the above permit all of the core strips to be of the same widths. Thus, in all cases ordinary commercially slit metal strip material may be used.

We claim:

1. A process for making a honeycomb laminate core from a plurality of metal strips, including shaping said strips so that when assembled side-by-side with their edges generally flush to form the core, they form internesting portions which normally intercontact throughout the extent of the core only if in perfect alignment, and interspaced wall portions which are curved in the plane of the core to act like springs so that by forcing said strips together sidewise their internesting portions spring to let them move sidewise into intercontact throughout the extent of the core whether or not the strips are shaped with their internesing portions in perfect alignment initially, assembling said shaped strips side-by-side with their edges generally flush to form the core with the strips forced sidewise to cause their internesing portions to intercontact throughout the core by springing as required, locating brazing metal at least adjacent to said strips' intercontacting portions, and applying brazing heat to said brazing metal and the core to cause the brazing metal to melt and flow along said intercontacting portions by capillary attraction.

2. A process for making a honeycomb laminate core from a plurality of metal strips, including shaping said strips so that when assembled side-by-side with their edges generally flush to form the core, they form internesting portions which normally intercontact throughout the extent of the core only if in perfect alignment, and interspaced wall portions which are curved in the plane of the core to act like springs so that by forcing said strips together sidewise their internesting portions spring to let them move sidewise into intercontact throughout the extent of the core whether or not the strips are shaped with their internesting portions in perfect alignment initially, assembling said shaped strips side-by-side with their edges generally flush to form the core with the strips forced sidewise to cause their internesting portions to intercontact throughout the core by springing as required, locating brazing metal at least adjacent to said strips' intercontacting portions, and applying brazing heat to said brazing metal and the core to cause the brazing metal to melt and flow along said intercontacting portions by capillary attraction; said strips forming said internesting portions and interspaced wall portions by being shaped into oppositely facing loops extending in zig zag fashion in the plane of the core and being assembled with the outsides of the loops of one strip located on the insides of the loops of the next throughout the core formed by the strips.

3. A process for making a honeycomb laminate core from a plurality of metal strips, including shaping said strips so that when assembled side-by-side with their edges generally flush to form the core, they form internesting portions which normally intercontact throughout the extent of the core only if in perfect alignment, and interspaced wall portions which are curved in the plane of the core to act like springs so that by forcing said strips together sidewise their internesting portions spring to let them move sidewise into intercontact throughout the extent of the core whether or not the strips are shaped with their internesting portions in perfect alignment initially, assembling said shaped strips side-by-side with their edges generally flush to form the core with the strips forced sidewise to cause their internesting portions to intercontact throughout the core by springing as required, locating brazing metal at least adjacent to said strips' intercontacting portions, and applying brazing heat to said brazing metal and the core to cause the brazing metal to melt and flow along said intercontacting portions by capillary attraction; said strips being forced sidewise by being forcibly inserted edgewise within a frame laterally defining a space of less dimensions than the assembled strips define when said curved portions are free from their said spring action.

4. A process for making honeycomb laminate having a core made from a plurality of metal strips and metal skins located on and fixed to the edges of these strips, including shaping said strips so that when assembled side-by-side with their edges generally flush to form the core the strips form internesting portions which normally intercontact throughout the extent of the core only if in perfect alignment, and interspaced wall portions which are curved in the plane of the core to act like springs so that by forcing said strips together sidewise their internesting portions spring to let them move sidewise into intercontact throughout the extent of the core whether or not the strips are shaped with their internesting portions in perfect alignment initially, assembling said shaped strips side-by-side with their edges generally flush to form the core with the strips forced sidewise to cause their internesting portions to intercontact throughout the extent of the core by spring as required, locating brazing metal on the edges of said strips on at least one side of said core, locating metal skins on both sides of said core to form a laminate assembly, said skins normally intercontacting said strips' edges only if the latter are perfectly flush, enclosing said laminate assembly in a metal fixture providing flexible diaphragms overlying said skins and evacuating this fixture to cause atmospheric pressure to flex said diaphragm and skins to spring the latter so they intercontact said strips' edges throughout the extent of said core whether or not said edges are perfectly flush, and applying brazing heat to said fixture to cause said brazing metal to melt and flow along all of the said intercontacting portions of said core strips' edges and said skins and the core strips' intercontacting portions by capillary attraction.

5. A process for making honeycomb laminate having a core made from a plurality of metal strips and metal skins located on and fixed to the edges of these strips, including shaping said strips so that when assembled side-by-side with their edges generally flush to form the core the strips form internesting portions which normally intercontact throughout the extent of the core only if in perfect alignment, and interspaced wall portions which are curved in the plane of the core to act like springs so that by forcing said strips together sidewise their internesting portions spring to let them move sidewise into intercontact throughout the extent of the core whether or not the strips are shaped with their internesting portions in perfect alignment initially, assembling said shaped strips side-by-side with their edges generally flush to form the core with the strips forced sidewise to cause their internesting portions to intercontact throughout the extent of the core by springing as required, locating brazing metal on the edges of said strips on at least one side of said core, locating metal skins on both sides of said core to form a laminate assembly, said skins normally intercontacting said strips' edges only if the latter are perfectly flush, enclosing said laminate assembly in a metal fixture providing flexible diaphragms overlying said skins and evacuating this fixture to cause atmospheric pressure to flex said diaphragms and skins to spring the latter so they intercontact said strips' edges throughout the extent of said core whether or not said edges are perfectly flush, and applying brazing heat to said fixture to cause said brazing metal to melt and flow along all of the said intercontacting portions of said core strips' edges and said skins and the core strips' intercontacting portions by capillary attraction; said strips forming said internesting portions and interspaced wall portions by being shaped into oppositely facing loops extending in zig zag fashion in the plane of the core and being assembled with the outsides of the loops of one strip located on the insides of the loops of the next throughout the core formed by the strips.

6. A process for making honeycomb laminate having a core made from a plurality of metal strips and metal skins located on and fixed to the edges of these strips, including shaping said strips so that when assembled side-by-side with their edges generally flush to form the core the strips form internesting portions which normally intercontact throughout the extent of the core only if in perfect alignment, and interspaced wall portions which are curved in the plane of the core to act like springs so that by forcing said strips together sidewise their internesting portions spring to let them move sidewise into intercontact throughout the extent of the core whether or not the strips are shaped with their internesting portions in perfect alignment initially, assembling said shaped strips side-by-side with their edges generally flush to form the core with the strips forced sidewise to cause their internesting portions to intercontact throughout the extent of the core by springing as required, locating brazing metal on the edges of said strips on at least one side of said core, locating metal skins on both sides of said core to form a laminate assembly, said skins normally intercontacting said strips' edges only if the latter are perfectly flush, enclosing said laminate assembly in a metal fixture providing flexible diaphragms overlying said skins and evacuating this fixture to cause atmospheric pressure to flex said diaphragms and skins to spring the latter so they intercontact said strips' edges throughout the extent of said core whether or not said edges are perfectly flush, and applying brazing heat to said fixture to cause said brazing metal to melt and flow along all of the said intercontacting portions of said core strips' edges and said skins and the core strips' intercontacting portions by capillary attraction; said strips being forced sidewise by being forcibly inserted edgewise within a frame laterally defining a space of less dimension than the assembled strips define when said curved portions are free from their said spring action.

7. A process for making honeycomb laminate having a core made from a plurality of metal strips and metal skins located on and fixed to the edges of these strips, including shaping said strips so that when assembled side-by-side with their edges generally flush to form the core the strips form internesting portions which normally intercontact throughout the extent of the core only if in perfect alignment, and interspaced wall portions which are curved in the plane of the core to act like springs so that by forcing said strips together sidewise their internesting portions spring to let them move sidewise into intercontact throughout the extent of the core whether or not the strips are shaped with their internesting portions in perfect alignment initially, assembling said shaped strips side-by-side with their edges generally flush to form the core with the strips forced sidewise to cause their internesting portions to intercontact throughout the extent of the core by springing as required, locating brazing metal on the edges of said strips on at least one side of said core, locating metal skins on both sides of said core to form a laminate assembly, said skins normally intercontacting said strips' edges only if the latter are perfectly flush, said strips being shaped to form tabs projecting from their said edges initially at outwardly directed angles, and applying pressure to said skins to force the latter sidewise towards said core strips' edges to spring said tabs inwardly as required to cause them all to intercontact the skins throughout the extent of said laminate assembly, and applying brazing heat to said assembly to cause said brazing metal to melt and flow along all of said intercontacting portions of said tabs and skins and core strips by capillary attraction.

8. A process for making honeycomb laminate having a core made from a plurality of metal strips and metal skins located on and fixed to the edges of these strips, including shaping said strips so that when assembled side-by-side with their edges generally flush to form the core the strips form internesting portions which normally intercontact throughout the extent of the core only if in perfect alignment, and interspaced wall portions which are curved in the plane of the core to act like springs so that by forcing said strips together sidewise their internesting portions spring to let them move sidewise into intercontact throughout the extent of the core whether or not the strips are shaped with their internesting portions in perfect alignment initially, assembling said shaped strips side-by-side with their edges generally flush to form the core with the strips forced sidewise to cause their internesting portions to intercontact throughout the extent of the core by springing as required, locating brazing metal on the edges of said strips on at least one side of said core, locating metal skins on both sides of said core to form a laminate assembly, said skins normally intercontacting said strips' edges only if the latter are perfectly flush, enclosing said laminate assembly in a metal fixture providing flexible diaphragms overlying said skins and evacuating this fixture to cause atmospheric pressure to flex said diaphragms and skins to spring the latter so they intercontact said strips' edges throughout the extent of said core whether or not said edges are perfectly flush, and applying brazing heat to said fixture to cause said brazing metal to melt and flow along all of the said skins and the core strips' intercontacting portions by capillary attraction; said strips forming said internesting portions and interspaced wall portions by being shaped into oppositely facing loops extending in zig zag fashion in the plane of the core and being assembled with the outsides of the loops of one strip located on the insides of the loops of the next throughout the core formed by the strips, said diaphragms and skins being thin enough to normally cause dimpling of said skins where unsupported by said core strips' edges, and baffle plates being interposed between said core and skin prior to said evacuation, said plates being thick enough to prevent said dimpling but flexible enough to spring said skins to cause said flexing thereof.

References Cited in the file of this patent

UNITED STATES PATENTS

| | | |
|---|---|---|
| 1,049,940 | Steichert | Jan. 7, 1913 |
| 2,445,801 | Partiot | July 27, 1948 |
| 2,686,957 | Koerper | Aug. 24, 1954 |
| 2,693,636 | Simpelaar | Nov. 9, 1954 |
| 2,746,139 | Van Pappelendam | May 22, 1956 |
| 2,752,672 | Tolman | July 3, 1956 |
| 2,794,243 | Schweller | June 4, 1957 |
| 2,796,157 | Ginsburg | June 18, 1957 |
| 2,816,355 | Herman | Dec. 17, 1957 |
| 2,845,698 | Giovannucci et al. | Aug. 5, 1958 |
| 2,851,133 | Steele | Sept. 9, 1958 |

FOREIGN PATENTS

| | | |
|---|---|---|
| 1,162,692 | France | Apr. 14, 1958 |